UNITED STATES PATENT OFFICE.

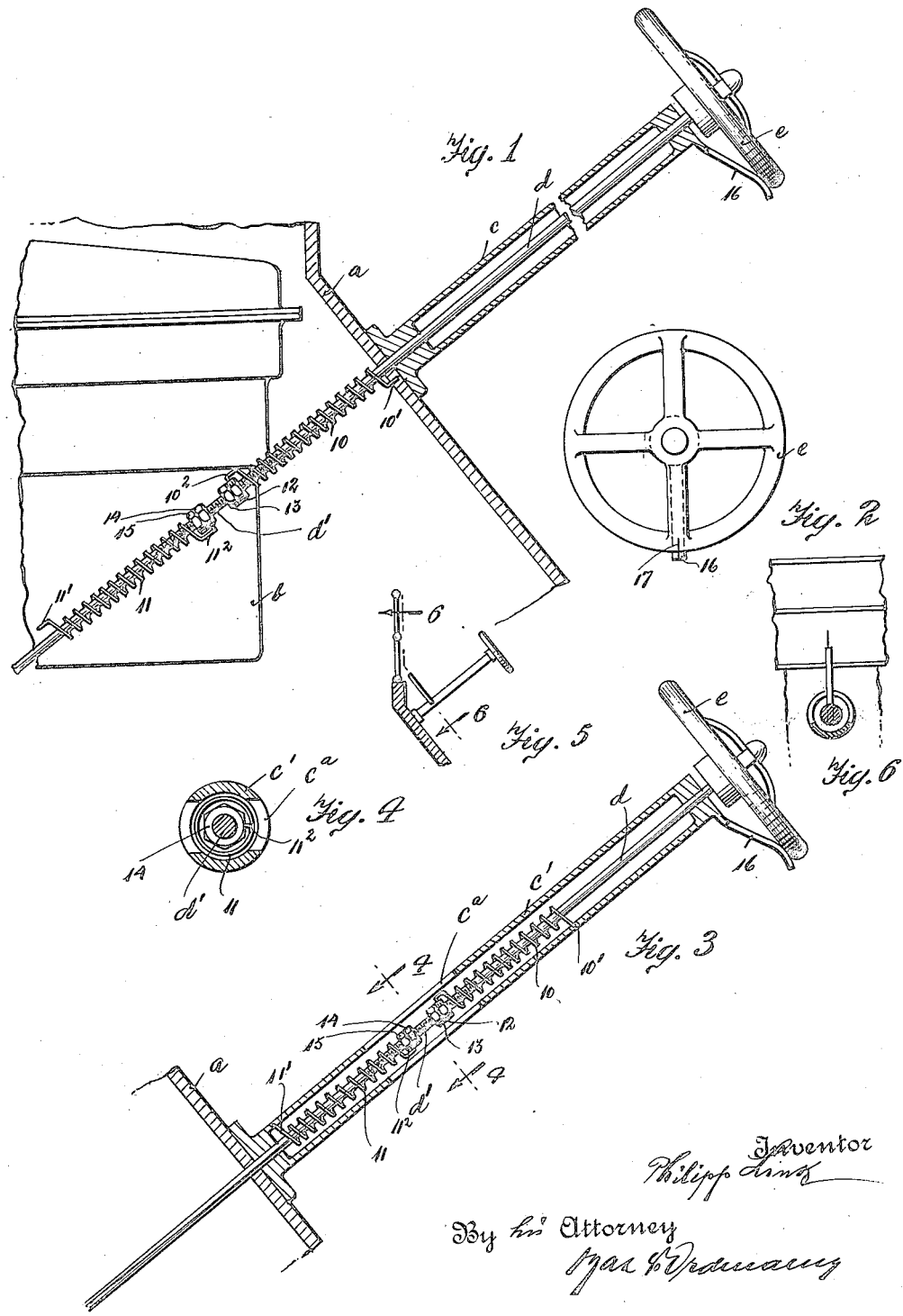

PHILIPP LINK, OF NEWARK, NEW JERSEY.

COUNTERBALANCING DEVICE FOR STEERING WHEEL POSTS.

1,425,109.   Specification of Letters Patent.   Patented Aug. 8, 1922.

Application filed July 26, 1921. Serial No. 487,764.

*To all whom it may concern:*

Be it known that I, PHILIPP LINK, a citizen of the United States of America, residing at Newark, in the county of Essex and State of New Jersey, have invented certain new and useful Improvements in Counterbalancing Devices for Steering Wheel Posts, of which the following is a specification.

This invention relates to motor driven vehicles and particularly to an improvement in the steering wheel post construction.

With ordinary constructions of motor vehicles the steering wheel has to be constantly held by the hands of the driver because the front wheels have the tendency to turn sideways. A momentary release of the steering wheel frequently results in serious accidents.

The object of this invention is to provide a counterbalancing device which will tend to maintain constantly the front wheels in straight position, and therefore, permit the release of the steering wheel whenever this may be required, without danger of accidents.

To accomplish this object my invention consists in the provision of oppositely acting springs which are adapted to actuate the steering wheel post so as to hold the latter constantly in a certain position.

I also provide adjusting means whereby the springs may be adjusted whenever the tension of one should vary from that of the other.

My invention also consists in the provision of suitable means for indicating from the driver's seat the position of the front wheels.

In the accompanying drawing in which similar reference characters denote corresponding parts, Fig. 1 is a sectional view of a part of a motor vehicle showing the springs applied to the steering wheel post; Fig. 2 is a face view of the steering wheel and the indicator; Fig. 3 is a similar view to that of Fig. 1 of a modified construction, and Fig. 4 is a cross section on line 4—4 of Fig. 3, and Figs. 5 and 6 show diagrammatically in side view and elevation a modified construction of an indicator.

In the drawing $a$ denotes the dash board of a motor vehicle, $b$ the motor, $c$ the casing or tubing around the post $d$ and $e$ the steering wheel. The post $d$ has a portion $d'$ provided with opposite threads. Mounted around the part of the post which extends below the dash board are two oppositely acting springs 10, 11, the remote ends $10'$, $11'$ of which are attached to stationary parts, such as the dash board $a$ and motor casing $b$, as shown. The adjacent ends $10^2$, $11^2$ of the springs are attached to the post $d$ itself, or, as shown, to screw nuts 12, 14 working on the threaded portion $d'$ thereof. The springs 10, 11 are adapted to be of uniform tension to in cooperation counterbalance each other, thereby normally holding the post $d$ in a certain position, i. e., in the position corresponding to the straight position of the front wheels of the vehicles. A slight force will be required to overcome the tension of one or the other of the springs when turning the steering post to the right or left of its neutral position. Thus normally the front wheels through the action of the counterbalancing springs will be caused to occupy and retain the straight position, so that the driver will be permitted without any danger to remove his hands from the steering wheel whenever a straight course is pursued.

Should the springs show variations in tensions an adjustment thereof can be effected by tightening or slackening the adjusting nuts 12, 14. Counter nuts 13, 15 may be used for preventing accidental slackening of the adjusting nuts 12 and 14.

In the modification shown in Fig. 3 the springs 10 and 11 are arranged around the part of the post projecting outwardly and upwardly from the dash board, and their ends $10'$, $11'$ are attached to the casing $c'$. To make these springs accessible for adjustment the sleeve or tubing $c'$ is cut out as at $c^a$ adjacent to the nuts 12, 13, 14 and 15.

Projecting from the tubing or casing $c'$ below and adjacent to the steering wheel $e$ is an indicator or finger 16. On the circumference of the steering wheel may be provided a mark 17 which when in register with the finger 16 will indicate to the driver the neutral position of the steering wheel and consequently the straight position of the wheels. In case when the steering wheel is released its mark 17 does not register with the finger 16 an adjustment of the springs will be necessary.

In lieu of the indicator or finger 16, a finger 18 in form of a pin or rod may be applied to the steering post $d$ as shown in Figs. 5 and 6 to project through a circular slot $c^2$ made in the casing or tubing near the dash board $a$. This finger 18 is adapted to project outwardly through said circular slot $c^2$ and terminate near the wind-shield, on which may be provided graduation or a scale with which the end of said finger is to register to indicate to the driver the position of the wheels. The finger 18 may be made adjustable longitudinally in order to permit the opening of the wind-shield.

Since various changes may be made in the construction of my device without departing from the spirit of my invention, I do not limit myself to the details described and shown.

What I claim is:—

1. In a steering wheel post for motor vehicles, oppositely acting counterbalancing springs mounted around said post and normally holding the post in a position corresponding to the straight position of the front wheels and means for the adjustment of the tension of said springs.

2. In a vehicle, a steering wheel post having an oppositely threaded portion, two oppositely acting counterbalancing springs mounted around said post in superposed position and attached with one of their ends to a stationary part of said vehicle, nuts working on said threaded portion and each having attached to it the other end of the corresponding spring, said springs serving normally to hold said post in neutral position.

3. In a vehicle, a steering wheel, a post therefor having an oppositely threaded portion, oppositely acting counterbalancing springs mounted around said post in superposed position, a casing for the post having a longitudinal opening opposite the threaded portion of the post, one end of each spring being fastened to said casing and nuts working on said threaded portion and accessible through said openings, the other end of each spring being attached to the corresponding nut, said springs serving to normally hold the post in neutral position and said nuts serving for the adjustment of the tension of said springs.

In testimony whereof I affix my signature in presence of two witnesses.

PHILIPP LINK.

Witnesses:
 MAX D. ORDMANN,
 JOSEPH T. MCMAHON.